United States Patent
Shinohara et al.

(10) Patent No.: US 11,966,064 B2
(45) Date of Patent: Apr. 23, 2024

(54) LIGHT GUIDE PLATE DEVICE INCLUDING AN OPTICAL PATH CHANGER

(71) Applicant: OMRON Corporation, Kyoto (JP)

(72) Inventors: Masayuki Shinohara, Kyoto (JP); Yasuhiro Tanoue, Kyoto (JP); Masafumi Danno, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/670,599

(22) Filed: Feb. 14, 2022

(65) Prior Publication Data

US 2022/0291439 A1 Sep. 15, 2022

(30) Foreign Application Priority Data

Mar. 15, 2021 (JP) ................. 2021-040942

(51) Int. Cl.
*G02B 30/60* (2020.01)
*F21V 8/00* (2006.01)
*G02B 27/18* (2006.01)
*G02B 30/33* (2020.01)
*G02B 30/35* (2020.01)
(Continued)

(52) U.S. Cl.
CPC ........... *G02B 30/60* (2020.01); *G02B 6/0031* (2013.01); *G02B 6/0055* (2013.01); *G02B 27/18* (2013.01); *G02B 30/33* (2020.01); *G02B 30/35* (2020.01); *G02B 30/36* (2020.01); *G02B 30/56* (2020.01)

(58) Field of Classification Search
CPC .... G02B 5/0045; G02B 6/0036; G02B 30/33; G02B 30/35; G02B 30/36; G02B 30/60
See application file for complete search history.

(56) References Cited

U.S. PATENT DOCUMENTS 9,459,461 B2 * 10/2016 Santori ............. G02B 27/4205
2011/0299270 A1 12/2011 Kojima et al.
2014/0152556 A1 6/2014 Ohbitsu
(Continued)

FOREIGN PATENT DOCUMENTS

CN 102334047 A 1/2012
CN 103733118 A 4/2014
(Continued)

OTHER PUBLICATIONS

Translated Chinese Office Action for counterpart application (Year: 2024).*

(Continued)

*Primary Examiner* — Keith G. Delahoussaye
(74) *Attorney, Agent, or Firm* — METROLEX IP LAW GROUP, PLLC

(57) ABSTRACT

A light guide plate according to one or more embodiments may include an incident surface that receives light, and an optical path changer on a back surface perpendicular to the incident surface. The optical path changer may reflect light to be emitted through an emission surface parallel to the back surface. The light emitted through the emission surface may form a formed image including a plane image representing a surface. The plane image may include a near imaging portion and a distant imaging portion. The plane image may have two ends included in the near imaging portion in a cross section perpendicular to the back surface and an optical axis of a light source.

9 Claims, 8 Drawing Sheets

(51) Int. Cl.
*G02B 30/36* (2020.01)
*G02B 30/56* (2020.01)

(56) References Cited

U.S. PATENT DOCUMENTS

| | | | |
|---|---|---|---|
| 2014/0293759 A1* | 10/2014 | Taff | G03H 1/2294 368/239 |
| 2017/0192244 A1* | 7/2017 | Shinohara | G02B 30/27 |
| 2017/0371088 A1 | 12/2017 | Kitamura et al. | |
| 2018/0101087 A1 | 4/2018 | Shinohara | |
| 2019/0137772 A1* | 5/2019 | Takagi | G02B 6/0035 |
| 2019/0179161 A1* | 6/2019 | Shinohara | G03B 35/18 |
| 2019/0377193 A1* | 12/2019 | Shinohara | G02B 30/27 |
| 2020/0371377 A1 | 11/2020 | Takagi et al. | |
| 2021/0263612 A1 | 8/2021 | Shinohara et al. | |
| 2021/0337180 A1 | 10/2021 | Hirose et al. | |
| 2022/0291440 A1 | 9/2022 | Shinohara et al. | |
| 2023/0205369 A1 | 6/2023 | Shinohara et al. | |

FOREIGN PATENT DOCUMENTS

| | | |
|---|---|---|
| CN | 107077003 A | 8/2017 |
| CN | 107111977 A | 8/2017 |
| CN | 107306507 A | 10/2017 |
| CN | 109844613 A | 6/2019 |
| CN | 111566406 A | 8/2020 |
| CN | 112262451 A | 1/2021 |
| CN | 115079437 A | 9/2022 |
| JP | 2016-114929 A | 6/2016 |

OTHER PUBLICATIONS

Chinese Office Action ("CNOA") issued on Jan. 31, 2024 in a counterpart Chinese patent application.

* cited by examiner

LIGHT GUIDE PLATE DEVICE INCLUDING AN OPTICAL PATH CHANGER

CROSS-REFERENCE TO RELATED APPLICATION

This application claims priority to Japanese Patent Application No. 2021-040942 filed on Mar. 15, 2021, the contents of which are incorporated herein by reference.

FIELD

The disclosure relates to a light guide plate device for displaying a stereoscopic image in a space.

BACKGROUND

A known stereoscopic image display device internally guides light from a light source, reflects the guided light using a reflector, and forms a stereoscopic image.

For example, the technique described in Patent Literature 1 uses a light guide plate and multiple light convergence members. The light guide plate guides light within a plane parallel to an emission surface. The light convergence members each have an optical face that receives light guided by the light guide plate to be emitted through the emission surface in a direction in which the light substantially converges at a single convergence point or a single convergence line in a space or in a direction in which the light substantially diverges from a single convergence point or a single convergence line in a space. The light convergence members each extend along a predetermined line within a plane parallel to the emission surface. The light convergence members each have a different convergence point or convergence line. A set of multiple convergence points or convergence lines forms a stereoscopic image in a space.

CITATION LIST

Patent Literature

Patent Literature 1: Japanese Unexamined Patent Application Publication No. 2016-114929

SUMMARY

A plane image displayed as a stereoscopic image with the technique described in Patent Literature 1 has more noticeable contrast deterioration than a line image.

One or more embodiments are directed to a light guide plate device with less noticeable contrast deterioration and blurring in a formed image.

A light guide plate device according to one or more embodiments may include an incident surface that receives light from a light source, and an optical path changer at a predetermined position on a back surface perpendicular to the incident surface. The optical path changer reflects light incident through the incident surface and guided to be emitted through an emission surface parallel to the back surface. The light emitted through the emission surface forms a formed image including a plane image representing a surface. The plane image includes an image of a continuous surface including a near imaging portion at an imaging position within a predetermined distance from the back surface and a distant imaging portion at an imaging position more distant than the predetermined distance from the back surface. The plane image has two ends included in the near imaging portion in a cross section perpendicular to the back surface and an optical axis of the light source.

The light guide plate device with the above structure forms an image with light received through the incident surface, reflected by the optical path changers arranged on the back surface, and emitted through the emission surface. The formed image includes a plane image representing a surface. The plane image is an image of a continuous surface including the near imaging portion and the distant imaging portion determined by the distance between the imaging position and the back surface.

A formed image typically may have contrast deterioration and blurring that are more noticeable at positions more distant from the back surface. In other words, the near imaging portion may have less noticeable contrast deterioration and blurring than the distant imaging portion. A formed image has contrast deterioration and blurring that are particularly noticeable at ends in a cross section parallel to the incident surface. In the above structure, the plane image has, in a cross section perpendicular to the back surface of the light guide plate and the optical axis of the light source, the two ends included in the near imaging portion. Such a structure may have less noticeable contrast deterioration and blurring in the formed image.

In a light guide plate device according to one or more embodiments, the predetermined distance may be 25% or less of a distance from the emission surface to a most distant imaging position of the distant imaging portion from the back surface.

In a light guide plate device according to one or more embodiments, the predetermined distance may be 50% or less of an average of distances from the back surface to imaging positions of image formation areas of the formed image.

In a light guide plate device according to one or more embodiments, the predetermined distance may be 12 mm from the back surface in a light emission direction and may be 24 mm from the back surface in a direction opposite to the light emission direction.

In a light guide plate device according to one or more embodiments, the predetermined distance may be 20% or less of a minimum distance between the incident surface and the optical path changer.

In a light guide plate device according to one or more embodiments, the predetermined distance may be 20% or less of a longer maximum length of a maximum length of a projected image area of the formed image on the back surface in a direction perpendicular to the incident surface and a maximum length of the projected image area in a direction parallel to the incident surface.

In the above structures, the predetermined distance defining the area of an image to be the near imaging portion is determined appropriately. Thus, the two ends in a cross section perpendicular to the back surface of the light guide plate and the optical axis of the light source are included in the near imaging portion determined based on the predetermined distance. Such a structure may have less noticeable contrast deterioration and blurring in the formed image.

In a light guide plate device according to one or more embodiments, the plane image may have an annular shape in a cross section parallel to the incident surface. The back surface may be located at a distance of 20% or less of a first distance from a center of the annular shape in a direction perpendicular to the emission surface. The first distance may be a distance from the center of the annular shape to a most distant imaging position in the direction perpendicular to the emission surface.

In the above structure, the plane image having an annular cross section parallel to the incident surface has many of its portions including its two ends in the cross section included in the near imaging portion. Such a structure may have still less noticeable contrast deterioration in the formed image.

In a light guide plate device according to one or more embodiments, a projected image of the plane image as viewed in a direction perpendicular to the emission surface may be longer in a direction parallel to the incident surface than in a direction perpendicular to the incident surface. Two ends of the projected image in the direction parallel to the incident surface may have imaging positions at the predetermined distance or less from the emission surface.

In the above-described structure, the projected image of the plane image included in the formed image as viewed in a direction perpendicular to the emission surface is longer in a direction parallel to the incident surface than in a direction perpendicular to the incident surface. The formed image including such a plane image has noticeable contrast deterioration and blurring. Such a plane image may have less noticeable contrast deterioration and blurring with imaging positions of the two ends in its projected image parallel to the incident surface within the predetermined distance from the emission surface.

In a light guide plate device according to one or more embodiments, in a projected image of the plane image as viewed in a direction perpendicular to the emission surface, two ends of the projected image in a direction parallel to the incident surface may have imaging positions at 30% or less of a second distance from the back surface. The second distance may be a distance from the back surface to a most distant imaging position of the distant imaging portion.

In the above described structure, many portions including the two ends are included in the near imaging portion in a cross section perpendicular to the back surface of the light guide plate and the optical axis of the light source. Such a structure may have less noticeable contrast deterioration and blurring in the formed image.

A light guide plate device according one or more embodiments may have less noticeable contrast deterioration in a formed image.

DETAILED DESCRIPTION

First Embodiment

One or more embodiments will now be described with reference to the drawings. For ease of explanation, the positive X-direction in FIG. 1 may be referred to as the rightward direction, the negative X-direction as the leftward direction, the positive Y-direction as the upward direction, the negative Y-direction as the downward direction, the positive Z-direction as the frontward direction, and the negative Z-direction as the rearward direction, while viewing the figure. The positive Y-direction may also be referred to as the light incidence direction, and the positive Z-direction as the light emission direction.

1. Example Use

Figure 1:
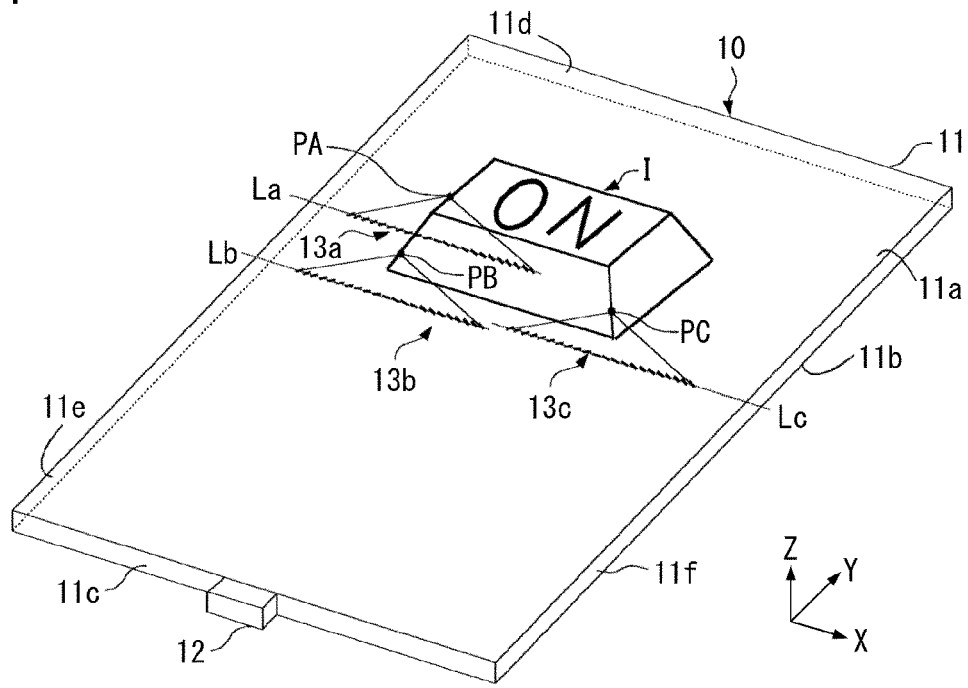
FIG. 1 is a diagram illustrating a perspective view of a light guide plate according to one or more embodiments showing an example use.

FIG. 1 is a perspective view of a light guide plate 11 according to one or more embodiments showing its example use. An example use of one or more embodiments will be described first with reference to FIG. 1. In FIG. 1, a display device 10 including the light guide plate 11 displays a stereoscopic image I, or more specifically, a stereoscopic image I of a button (protruding in the positive Z-direction) showing the word ON. As shown in FIG. 1, the display device 10 includes the light guide plate 11 (light guide plate device) and a light source 12.

The light guide plate 11 has a rectangular parallelepiped shape and is formed from a transparent resin material with a relatively high refractive index. The material for the light guide plate 11 may be a polycarbonate resin, a polymethyl methacrylate resin, or glass. The light guide plate 11 has an emission surface 11a for light emission, a back surface 11b parallel to and opposite to the emission surface 11a, and four end faces 11c, 11d, 11e, and 11f. The end face 11c is an incident surface through which light emitted from the light source 12 enters the light guide plate 11. Hereafter, the end face 11c will also be referred to as the incident surface 11c.

The end face 11d is opposite to the end face 11c. The end face 11e is opposite to the end face 11f. The light guide plate 11 guides light from the light source 12 to diverge within a plane parallel to the emission surface 11a. The light source 12 is, for example, a light-emitting diode (LED).

The light guide plate 11 includes multiple optical path changers on the back surface 11b, including an optical path changer 13a, an optical path changer 13b, and an optical path changer 13c. Hereafter, the multiple optical path changers including the optical path changer 13a, the optical path changer 13b, and the optical path changer 13c may also be collectively referred to as the optical path changers 13. The optical path changers 13 are located at predetermined positions on the back surface 11b perpendicular to the incident surface 11c. The optical path changers 13 reflect light entering through the incident surface 11c and guided to be emitted through the emission surface 11a parallel to the back surface 11b. The optical path changers 13 at the predetermined positions are arranged substantially sequentially and extend in X-direction. More specifically, as shown in FIG. 1, the optical path changer 13a is arranged along a line La, the optical path changer 13b is arranged along a line Lb, and the optical path changer 13c is arranged along a line Lc. The lines La, Lb, and Lc are straight and substantially parallel to X-direction. Any optical path changers 13 are arranged substantially sequentially along straight lines parallel to X-direction. In other words, the optical path changers 13 are arranged along predetermined lines within a plane parallel to the back surface 11b. Each optical path changer 13 receives, across its length in X-direction, the light emitted from the light source 12 and guided by the light guide plate 11. The optical path changer 13 substantially converges light incident at positions across the length of each optical path changer 13 to a fixed point corresponding to the optical path changer 13. FIG. 1 shows the convergence of light reflected by the optical path changer 13a, the optical path changer 13b, and the optical path changer 13c, among the optical path changers 13.

More specifically, light from positions across the length of the optical path changer 13a converges at a fixed point PA included in the stereoscopic image I. Thus, the wave surface of light from the optical path changer 13a appears to be the wave surface of light emitted from the fixed point PA. Light from positions across the length of the optical path changer 13b converges at a fixed point PB included in the stereoscopic image I. Thus, the wave surface of light from the optical path changer 13b appears to be the wave surface of light emitted from the fixed point PB. Light from positions across the length of the optical path changer 13c converges similarly to the light from positions across the length of the optical path changers 13a and 13b. In the above-described manner, light from positions across the length of an optical path changer 13 substantially converges at a fixed point corresponding to the optical path changer 13. Any optical path changer 13 thus provides the wave surface of light that appears to be emitted from the corresponding fixed point. Different optical path changers 13 correspond to different fixed points. A set of multiple fixed points corresponding to the optical path changers 13 forms a stereoscopic image I viewable by the user in a space (more specifically, in a space above the emission surface 11a of the light guide plate 11).

2. Example Structure

Figure 2:
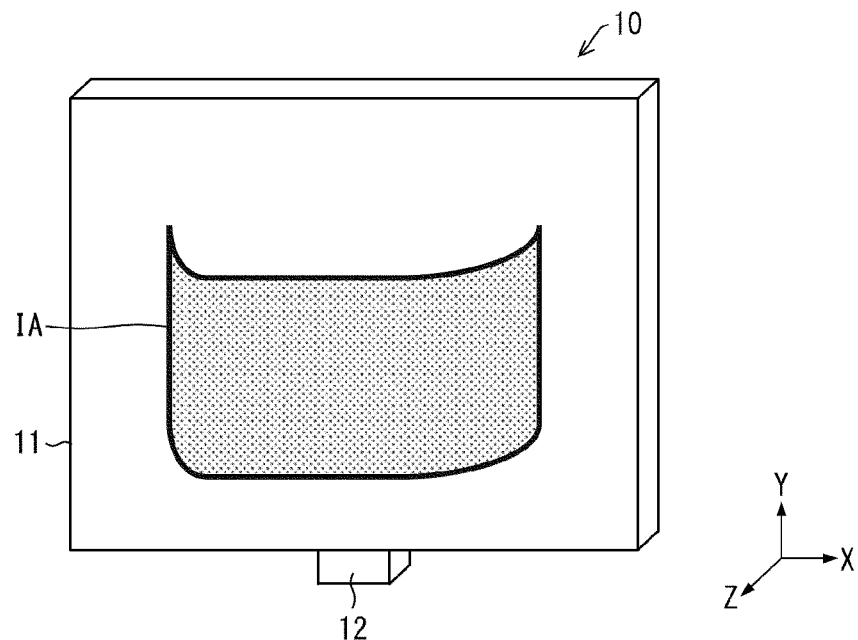
FIG. 2 is a diagram illustrating a perspective view of a light guide plate according to one or more embodiments showing an example structure.
Figure 3:
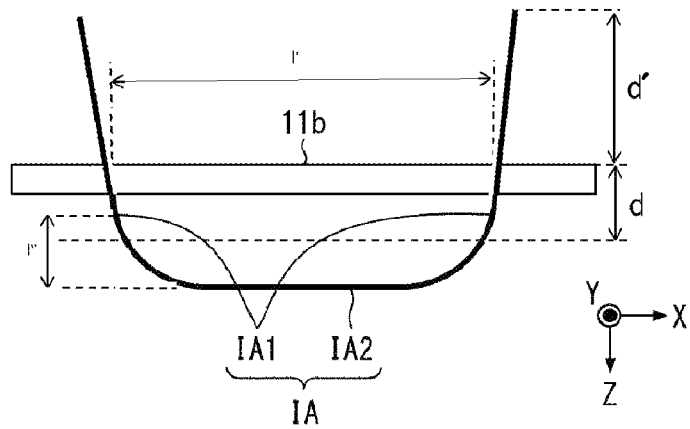
FIG. 3 is a diagram illustrating a cross-sectional view of a light guide plate, such as is shown in FIG. 2, showing a cross section parallel to an incident surface.

FIG. 2 is a perspective view of the light guide plate 11 according to one or more embodiments showing its example structure. FIG. 3 is a cross-sectional view of the light guide plate 11 shown in FIG. 2 showing a cross section parallel to the incident surface 11c. In the example shown in FIGS. 2 and 3, light emitted from the light guide plate 11 forms a stereoscopic image IA (formed image) viewable by the user in a space. For ease of explanation, the portion of the stereoscopic image IA appearing frontward from the back surface 11b, or the real image, as well as the portion of the stereoscopic image IA appearing rearward from the back surface 11b, or the virtual image, are each referred to as a portion or image being formed. More specifically, the light guide plate 11 in FIGS. 2 and 3 includes multiple optical path changers 13 on the back surface 11b to display the stereoscopic image IA.

As shown in FIG. 2 and FIG. 3, the stereoscopic image IA is a strip-shaped plane image. A plane image herein refers to an image representing a surface and having imaging points with a density of at least 30% per unit area in an imaging plane. A plane image also has the brightest point with a full width at half maximum (FWHM) of greater than 2 mm. Thus, a plane image may be entirely solid or may be, for example, hatched.

The stereoscopic image IA may include a plane image and an image other than a plane image, or for example, a line image. A line image herein has the brightest point with an FWHM of less than or equal to 2 mm. The stereoscopic image IA described herein may be a plane image including a plane image and an image other than a plane image.

As shown in FIG. 3, the stereoscopic image IA is an image of a continuous surface including a near imaging portion IA1 and a distant imaging portion IA2. The near imaging portion IA1 has imaging positions located within a predetermined distance d from the back surface 11b of the light guide plate 11. The distant imaging portion IA2 has imaging positions located more distant than the predetermined distance d from the back surface 11b. The predetermined distance d will be described later.

As shown in FIG. 3, the stereoscopic image IA has the two ends included in the near imaging portion IA1 in a cross section perpendicular to the back surface 11b and the optical axis of the light source 12. An image formed with the light guide plate 11 has contrast deterioration and blurring that are more noticeable at imaging positions more distant from the back surface 11b. In other words, the near imaging portion IA1 has less noticeable contrast deterioration and blurring than the distant imaging portion IA2. An image formed with the light guide plate 11 has contrast deterioration and blurring that are particularly noticeable at ends in a cross section parallel to the incident surface 11c. The stereoscopic image IA has the two ends included in the near imaging portion IA1 in the cross section perpendicular to the back surface 11b and the optical axis of the light source 12. Thus, the light guide plate 11 causes less noticeable contrast deterioration and blurring in the stereoscopic image IA.

In the present example structure, a projected image of the stereoscopic image IA as viewed in a direction perpendicular to the emission surface 11a is longer in a direction parallel to the incident surface 11c than in a direction perpendicular to the incident surface 11c. Such a stereoscopic image IA has noticeable contrast deterioration and blurring. Such a stereoscopic image IA may have less noticeable contrast deterioration and blurring with imaging positions of the two ends in its projected image in a direction parallel to the incident surface 11c within the predetermined distance d from the emission surface 11a.

3. Operation Examples

The predetermined distance d will now be described in detail as an operation example of the light guide plate 11 according to the embodiments of the present disclosure.

The predetermined distance d may be 25% or less of the distance from the back surface 11b to the most distant imaging position of the stereoscopic image IA from the back surface 11b. The predetermined distance d may be 50% or less of the average of distances from the back surface IIb to the imaging positions of the image formation areas of the stereoscopic image IA. The predetermined distance d may be a distance between 12 mm from the back surface 11b in the light emission direction and 24 mm from the back surface 11b in a direction opposite to the light emission direction (e.g., d').

The predetermined distance d may be 20% or less of a minimum distance between the incident surface 11c and the optical path changers 13. Light incident on an optical path changer 13 located at a shorter distance from the incident surface 11c diverges more, which is likely to cause contrast deterioration and blurring when, for example, a viewpoint changes. The predetermined distance d can be determined as described above in accordance with the minimum distance between the incident surface 11c and the optical path changers 13 to cause less noticeable contrast deterioration and blurring in the stereoscopic image IA formed with the light guide plate 11 including the optical path changers 13.

The predetermined distance d may be 20% or less of a longer one of a maximum length l' of a projected image area of the stereoscopic image IA on the back surface 11b in a direction perpendicular to the incident surface 11c and a maximum length l" of the projected image area in a direction parallel to the incident surface 11c.

In the above structures, the predetermined distance d defining the area of an image to be the near imaging portion IA1 is determined appropriately. With a plane image having, in a cross section perpendicular to the back surface 11b and the optical axis of the light source 12, the two ends included in the near imaging portion IA1 defined by the predetermined distance d, the stereoscopic image IA may have less noticeable contrast deterioration and blurring.

The optical path changers 13 for imaging positions frontward from the back surface 11b spread reflected light more laterally than the optical path changers 13 for imaging positions rearward from the back surface 11b. Thus, light reflected by multiple optical path changers 13 is more likely to appear to be superimposed in the area in the stereoscopic image IA frontward from the back surface 11b than in the area in the stereoscopic image IA rearward from the back surface 11b. The above-described structure is more likely to cause blurring in the stereoscopic image IA and design deterioration in the stereoscopic image IA due to the blurring.

In the above example, the predetermined distance d may be 12 mm from the back surface 11b in the light emission direction and 24 mm from the back surface 11b in a direction opposite to the light emission direction. Similarly, the predetermined distance d may be shorter in the light emission direction than the predetermined distance d in a direction opposite to the light emission direction. The predetermined distance d determined in such a manner may cause less blurring in the stereoscopic image IA particularly frontward from the back surface 11b and less design deterioration in the stereoscopic image IA due to the blurring.

Figure 16:
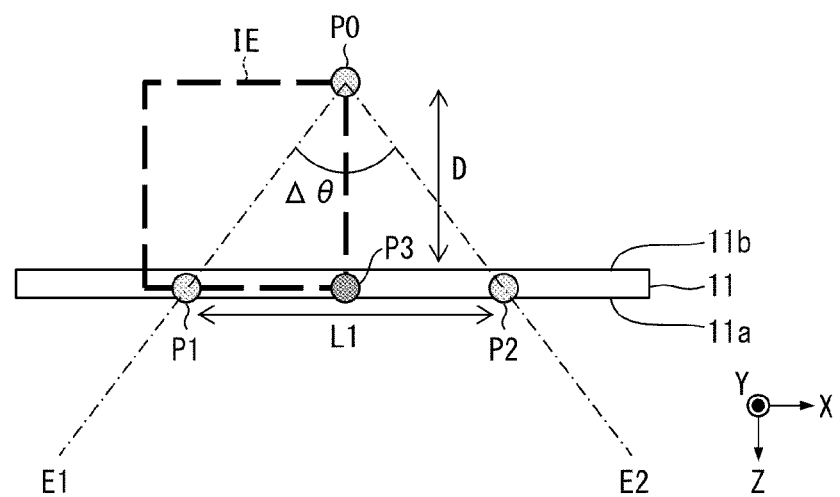
FIG. 16 is a diagram illustrating an arrangement for describing a method for deriving a depth of an imaging point in a stereoscopic image formed rearward from a light guide plate.

FIG. 16 is a diagram describing a method for deriving a depth D of an imaging point P0 in a stereoscopic image IE formed rearward from the light guide plate 11. The stereoscopic image IE is substantially cubic. A method for deriving the depth D of the point P0 will now be described with reference to FIG. 16.

To derive the depth D of the point P0, the stereoscopic image IE is viewed from two viewpoints E1 and E2. The viewpoints E1 and E2 correspond to the left eye and the right eye of a user viewing the stereoscopic image IE. The point P0 projected on the emission surface 11a of the light guide plate 11 as viewed from the viewpoint E1 is defined as a point P1. The point P0 projected on the emission surface 11a of the light guide plate 11 as viewed from the viewpoint E2 is defined as a point P2. When the distance between the point P1 and the point P2 is defined as L1, and the angle between the viewpoints E1 and E2 with respect to the point P0 is defined as $\Delta\theta$, the depth $D=L1/\Delta\theta$.

Figure 17:
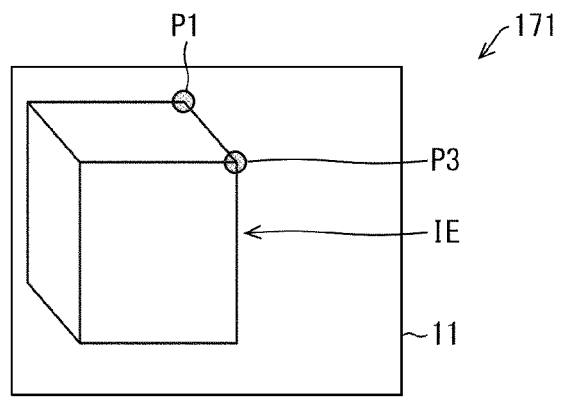
FIG. 17 is a diagram illustrating an arrangement for describing a method for calculating a depth shown in FIG. 16 through image analysis.
Figure 17:
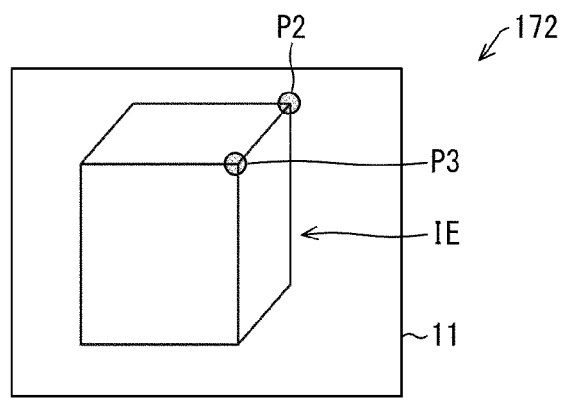
Figure 17:
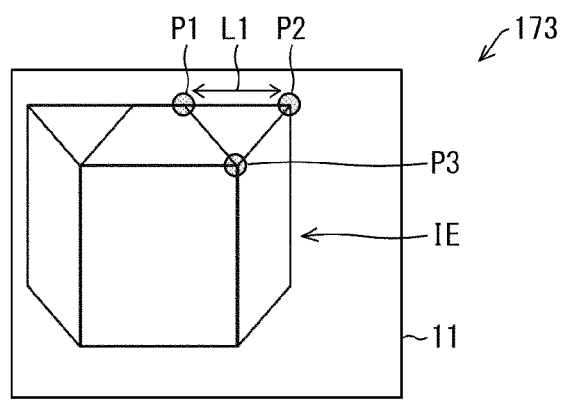

FIG. 17 is a diagram describing a method for calculating the depth D through image analysis. FIG. 17 shows the light guide plate 11 and the stereoscopic image IE viewed from the viewpoint E1 with reference numeral 171, the light guide plate 11 and the stereoscopic image IE viewed from the viewpoint E2 with reference numeral 172, and an image of the images denoted with reference numerals 171 and 172 superimposed on each other with reference numeral 173. A method for calculating the depth D through image analysis will now be described with reference to FIG. 17.

To calculate the depth D through image analysis, a point on the emission surface 11a is determined as a point P3. The point P3 may be any point included in the stereoscopic image IE formed on the emission surface 11a. The point P3 may be a point marked on the emission surface 11a without being included in the stereoscopic image IE. The point P3 on the emission surface 11a may be at a constant position from any viewpoint position.

In the image analysis, the images with reference numerals 171 and 172 are superimposed on each other to have the same point P3 in each image as indicated by reference numeral 173. The point P3 on the emission surface 11a is at a constant position from any viewpoint position. Thus, the distance between the point P1 and the point P2 in the image with reference numeral 173 is equal to the distance L1 shown in FIG. 16. As described above, the depth D can thus be calculated as the depth $D=L1/\Delta\theta$.

4. Modifications

One or more embodiments described in detail above is a mere example of one or more embodiments in all respects. One or more embodiments may be variously modified or altered without deviating from the scope. For example, one or more embodiments may be modified in the forms described below. The same components as those in the above embodiment are hereafter given the same reference numerals, and the operations that are the same as those in the above embodiment will not be described. The modifications described below may be combined as appropriate.

4.1

Figure 4:
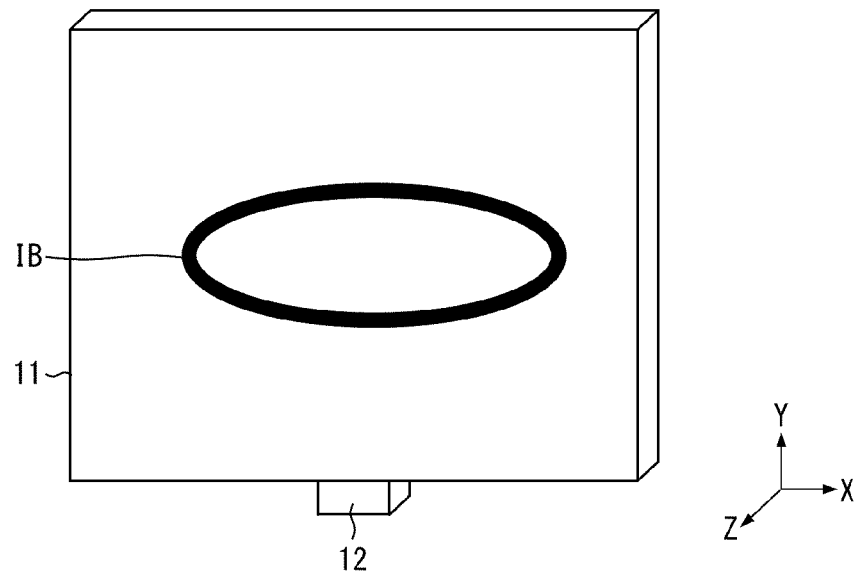
FIG. 4 is a diagram illustrating a perspective view of a light guide plate according to one or more embodiments, in a first modification.
Figure 5:
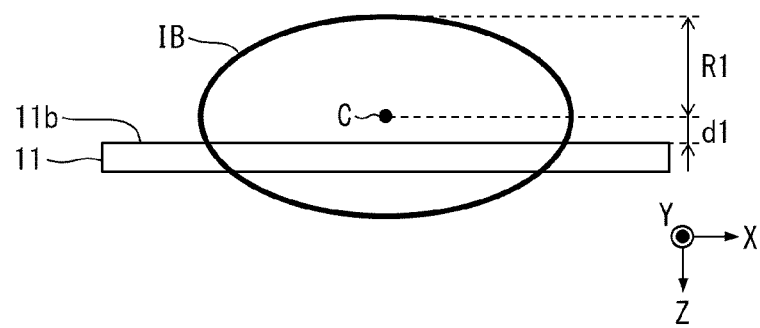
FIG. 5 is a diagram illustrating a cross-sectional view of a light guide plate, such as is shown in FIG. 4, showing a cross section parallel to an incident surface.

FIG. 4 is a perspective view of a light guide plate 11 according to a first modification. FIG. 5 is a cross-sectional view of the light guide plate 11 such as is shown in FIG. 4 showing a cross section parallel to the incident surface 11c.

As shown in FIG. 4 and FIG. 5, the light guide plate 11 according to the present modification forms a stereoscopic image IB (formed image). The stereoscopic image IB is a plane image that is annular in a cross section parallel to the incident surface 11c. The stereoscopic image IB may include a plane image and an image other than the plane image, or for example, a line image. The stereoscopic image IB described herein may be a plane image including a plane image and an image other than a plane image.

In the present modification, as shown in FIG. 5, the distance from a center C of the annular shape of the stereoscopic image IB to the most distant imaging position of the stereoscopic image IB in a direction (Z-direction) perpendicular to the emission surface 11a is defined as a first distance R1. Accordingly, the back surface 11b may be at a distance d1 that is 20% or less of the first distance R1 from the center C of the annular shape in the direction perpendicular to the emission surface 11a. In other words, the distance may be d1<0.2×R1.

The light guide plate 11 shown in FIG. 5 may allow a plane image having an annular cross section parallel to the incident surface 11c to have many of its portions including the two ends in the cross section being included in the near imaging portion IA1 (refer to FIG. 3). Such a structure has still less noticeable contrast deterioration in the stereoscopic image IB.

4.2

Figure 6:
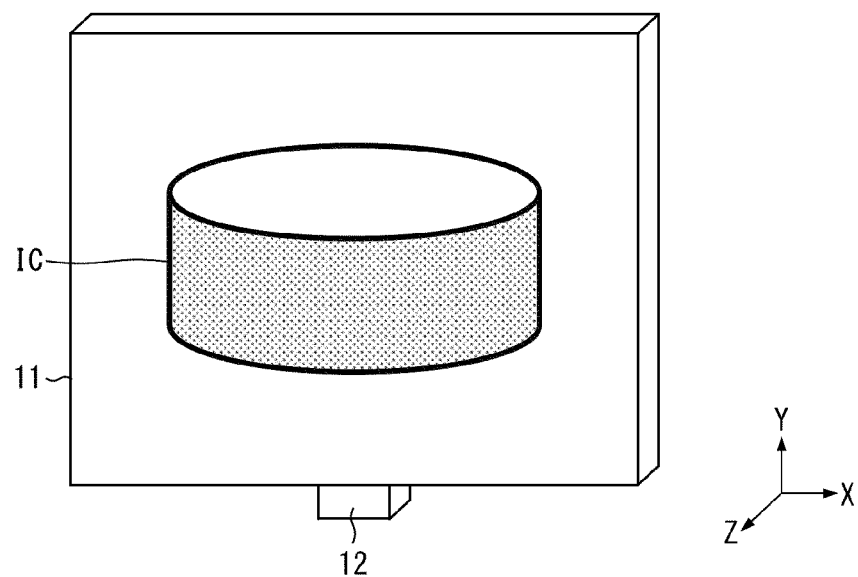
FIG. 6 is a diagram illustrating a perspective view of a light guide plate according to one or more embodiments, in a second modification.

FIG. 6 is a perspective view of a light guide plate 11 according to a second modification. As shown in FIG. 6, the light guide plate 11 according to the present modification forms a stereoscopic image IC (formed image). The stereoscopic image IC has the shape of a cylinder having open ends. The stereoscopic image IC may have, in its rear portion, the same plane image as in its front portion. The plane image in the rear portion may have a smaller tone value than the plane image in the front portion. The stereoscopic image IC may have, in its rear portion, a line image representing a contour alone. The stereoscopic image IC having the rear portion represented by either a plane image or a line image described above may be formed with the two ends in a cross section perpendicular to the back surface 11b and the optical axis of the light source 12 included in the near imaging portion IA1. Such a structure has less noticeable contrast deterioration in the stereoscopic image IC.

4.3

Figure 7:
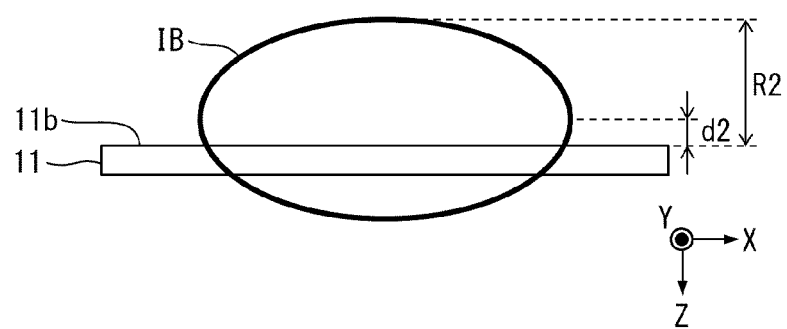
FIG. 7 is a diagram illustrating a light guide plate according to one or more embodiments, in a third modification.

FIG. 7 is a diagram of a light guide plate 11 according to a third modification. As shown in FIG. 7, the light guide plate 11 according to the present modification forms the stereoscopic image IB. The stereoscopic image IB has the shape described with reference to FIG. 4 and FIG. 5.

In the present modification, as shown in FIG. 7, the distance from the back surface 11b to the most distant imaging position from the back surface 11b is defined as a second distance R2 in a projected image of the stereoscopic image IB as viewed in a direction perpendicular to the emission surface 11a. A distance d2 from the back surface 11b to the imaging positions of the two ends of the projected image in X-direction (direction parallel to the incident surface 11c) may be 30% or less of the second distance R2. In other words, the distance may be d2<0.3×R2.

The light guide plate 11 shown in FIG. 7 may allow a plane image to have many of its portions including the two ends in the cross section perpendicular to the back surface 11b and the optical axis of the light source 12 being included in the near imaging portion IA1 (refer to FIG. 3). Such a structure causes still less noticeable contrast deterioration in the stereoscopic image IB.

4.4

Figure 8:
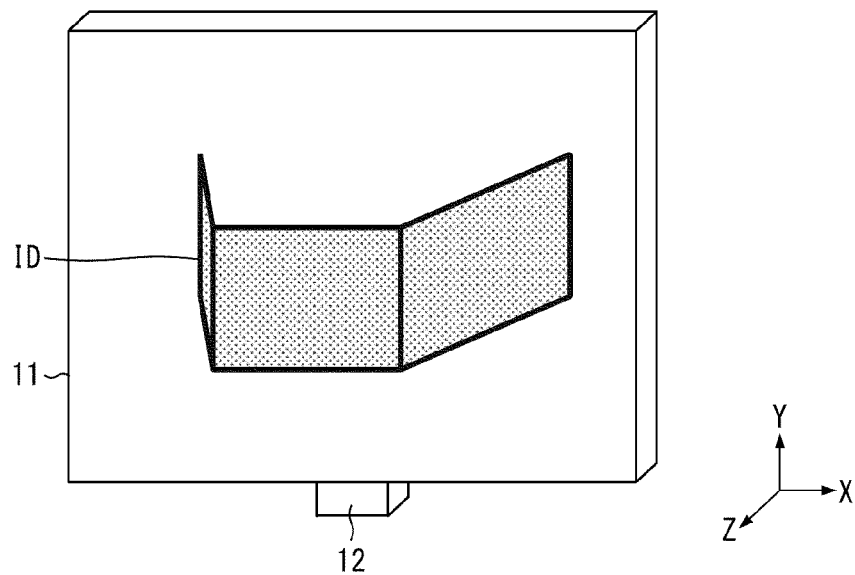
FIG. 8 is a diagram illustrating a light guide plate according to one or more embodiments, in a fourth modification.
Figure 9:
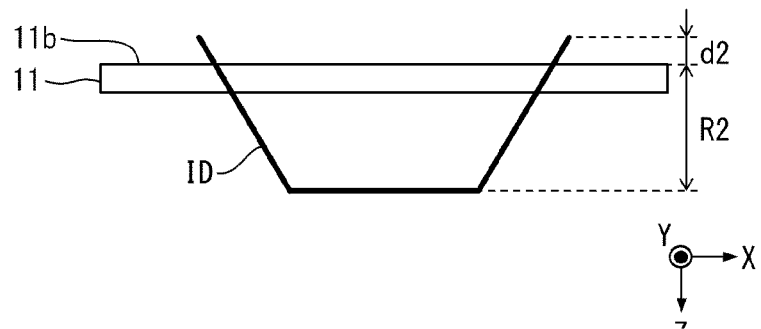
FIG. 9 is a diagram illustrating a cross-sectional view of a stereoscopic image shown in FIG. 8 showing a cross section parallel to an incident surface.

FIG. 8 is a diagram of a light guide plate 11 according to a fourth modification. FIG. 9 is a cross-sectional view of a stereoscopic image ID (formed image), such as is shown in FIG. 8 showing a cross section parallel to the incident surface 11c. The stereoscopic image ID may include a plane image and an image other than a plane image, or for example, a line image.

As shown in FIG. 8 and FIG. 9, the light guide plate 11 according to the present modification forms the stereoscopic image ID. The stereoscopic image ID is a plane image having two ends in X-direction in a cross section parallel to the incident surface 11c bent rearward. In other words, the stereoscopic image ID shown in FIG. 8 and FIG. 9 has, in a cross section parallel to the incident surface 11c, a shape different from the annular shape of the stereoscopic image IB shown in FIG. 7.

As shown in FIG. 9, in a projected image of the stereoscopic image ID as viewed in a direction perpendicular to the emission surface 11a, the distance d2 may be 30% or less of the second distance R2. The light guide plate 11 shown in FIG. 9 thus causes still less noticeable contrast deterioration in the stereoscopic image ID.

4.5

A display device 10A as a modification of the display device 10 will now be described.

Figure 10:
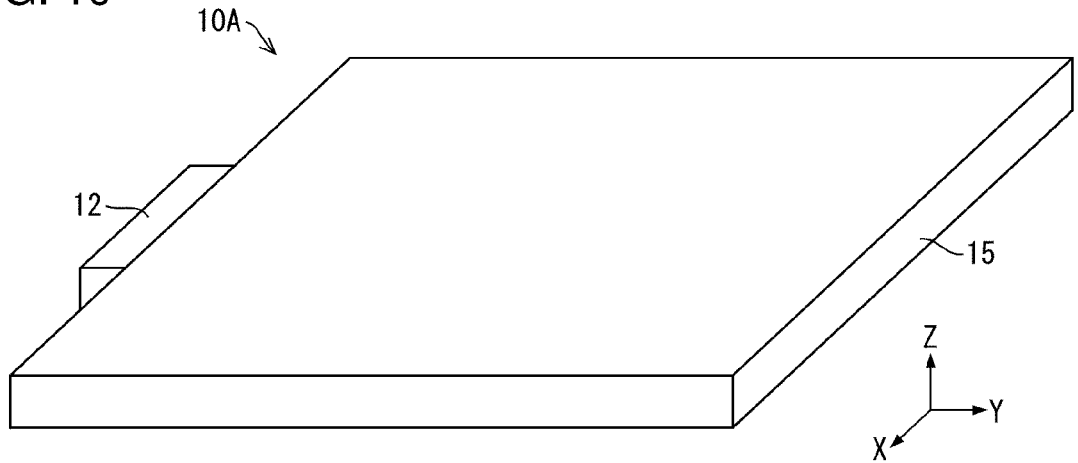
FIG. 10 is a diagram illustrating a perspective view of a modified display device according to one or more embodiments.

FIG. 10 is a perspective view of the display device 10A. As shown in FIG. 10, the display device 10A includes the light source 12 and a light guide plate 15. The light guide plate 15 is a modification of the light guide plate 11 described above.

Figure 11:
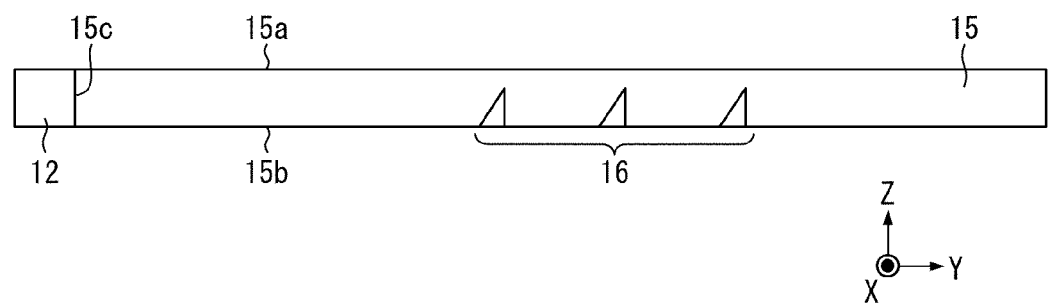
FIG. 11 is a diagram illustrating a cross-sectional view of a light guide plate device, such as is shown in FIG. 10, showing a structure of each optical path changer included in the light guide plate device.
Figure 12:
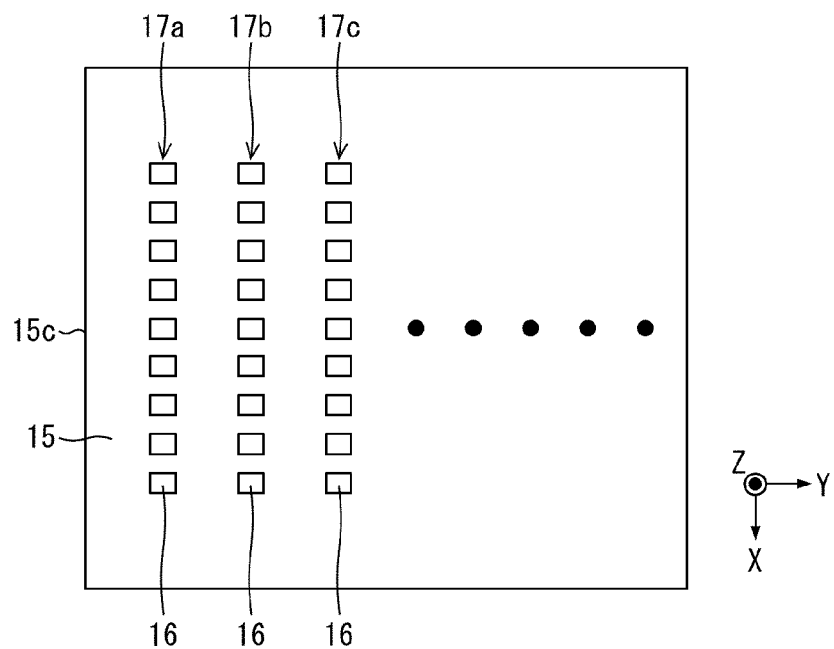
FIG. 12 is a diagram illustrating a plan view of a light guide plate device, such as is shown in FIG. 10, showing a structure.
Figure 13:
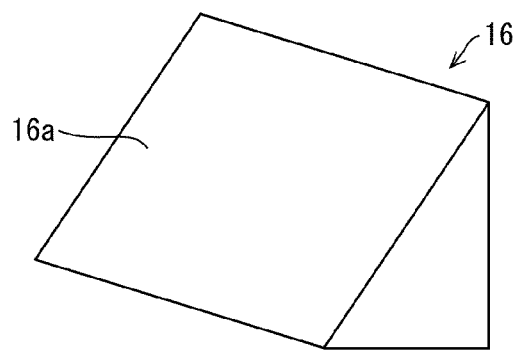
FIG. 13 is a diagram illustrating a perspective view of one of multiple optical path changers included in a light guide plate device, such as is shown in FIG. 10.

FIG. 11 is a cross-sectional view of the light guide plate 15 showing the structure of each optical path changer 16 included in the light guide plate 15. FIG. 12 is a plan view of the light guide plate 15 showing its structure. FIG. 13 is a perspective view of one of the multiple optical path changers 16 included in the light guide plate 15.

The light guide plate 15 guides light (incident light) received from the light source 12. The light guide plate 15 is formed from a transparent resin material with a relatively high refractive index. The material for the light guide plate 15 may be a polycarbonate resin or a polymethyl methacrylate resin. In the present modification, the light guide plate 15 is formed from a polymethyl methacrylate resin. As shown in FIG. 11, the light guide plate 15 has an emission surface 15a, a back surface 15b, and an incident surface 15c.

The emission surface 15a may allow light guided within the light guide plate 15 and redirected by the optical path changers 16 (described later) to be emitted. The emission surface 15a is a front surface of the light guide plate 15. The back surface 15b is parallel to the emission surface 15a and includes the optical path changers 16 (described later) arranged on the surface. The incident surface 15c receives light emitted from the light source 12 to allow the light to enter the light guide plate 15.

The light emitted from the light source 12 enters the light guide plate 15 through the incident surface 15c and is then totally internally reflected by the emission surface 15a or the back surface 15b and is guided within the light guide plate 15.

As shown in FIG. 11, the optical path changers 16 are arranged on the back surface 15b and inside the light guide plate 15. The optical path changers 16 redirect the light guided within the light guide plate 15 to be emitted through the emission surface 15a. The multiple optical path changers 16 are arranged on the back surface 15b of the light guide plate 15.

As shown in FIG. 12, the optical path changers 16 are arranged parallel to the incident surface 15c. As shown in FIG. 13, each optical path changer 16 is a triangular pyramid and has a reflective surface 16a that reflects (totally internally reflects) incident light. The optical path changer 16 may be, for example, a recess on the back surface 15b of the light guide plate 15. The optical path changer 16 may not be a triangular pyramid. As shown in FIG. 12, the light guide plate 15 includes multiple optical path changer sets 17a, 17b, 17c, . . . each including multiple optical path changers 16 on the back surface 15b.

Figure 14:
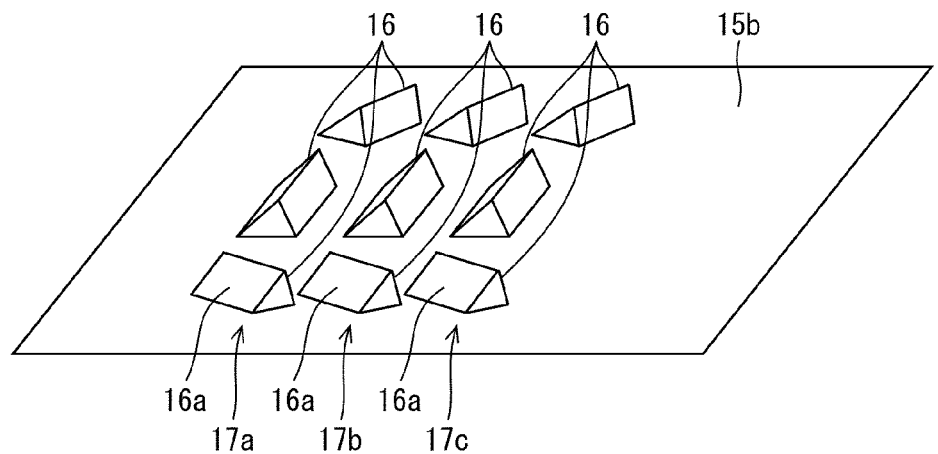
FIG. 14 is a diagram illustrating a perspective view of optical path changers with a structure, such as is shown in FIG. 13 showing an arrangement thereof.

FIG. 14 is a perspective view of the optical path changers 16 showing their arrangement. As shown in FIG. 14, the optical path changer sets 17a, 17b, 17c, . . . each include multiple optical path changers 16 arranged on the back surface 15b of the light guide plate 15 with reflective surfaces 16a forming different angles with the direction of incident light. The above-described arrangement may allow the optical path changer sets 17a, 17b, 17c, . . . to redirect incident light to be emitted in various directions through the emission surface 15a.

The light guide plate 15 forming a stereoscopic image I will now be described with reference to FIG. 15. In the present example, light redirected by the optical path changers 16 is used to form the stereoscopic image I as a plane image on a stereoscopic imaging plane P perpendicular to the emission surface 15a of the light guide plate 15.

Figure 15:
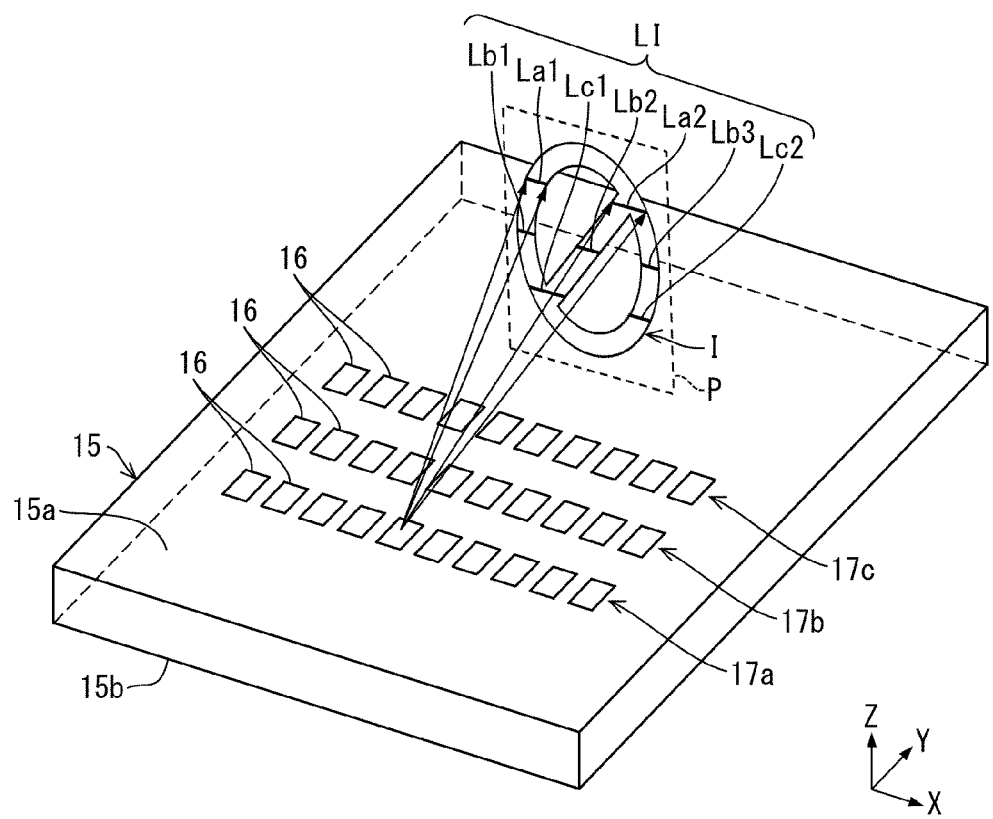
FIG. 15 is a diagram illustrating a perspective view of a light guide plate device, such as is shown in FIG. 10, describing a formation of a stereoscopic image.

FIG. 15 is a perspective view of the light guide plate 15 describing the formation of the stereoscopic image I. In the present example, the stereoscopic image I formed on the stereoscopic imaging plane P is a sign of a ring with a diagonal line inside.

In the light guide plate 15, for example, light redirected by each optical path changer 16 in the optical path changer set 17a intersects with the stereoscopic imaging plane P at a line La1 and a line La2 as shown in FIG. 15. The intersections with the stereoscopic imaging plane P form line images LI as part of the stereoscopic image I. The line images LI are parallel to the XZ plane. Accordingly, light from the multiple optical path changers 16 included in the optical path changer set 17a forms the line images LI of the line La1 and the line La2. The light forming the images of the line La1 and the line La2 may be provided by at least two of the optical path changers 16 in the optical path changer set 17a.

Similarly, light redirected by each optical path changer 16 in the optical path changer set 17b intersects with the stereoscopic imaging plane P at a line Lb1, a line Lb2, and a line Lb3. The intersections with the stereoscopic imaging plane P form line images LI as part of the stereoscopic image I.

Light redirected by each optical path changer 16 in the optical path changer set 17c intersects with the stereoscopic imaging plane P at a line Lc1 and a line Lc2. The intersections with the stereoscopic imaging plane P form line images LI as part of the stereoscopic image I.

The optical path changer sets 17a, 17b, 17c, . . . form line images LI at different positions in Z-direction. The optical path changer sets 17a, 17b, 17c, . . . in the light guide plate 15 may be arranged at smaller intervals to form the line images LI at smaller intervals in Z-direction. Thus, the light guide plate 15 combines the multiple line images LI formed by the light redirected by the optical path changers 16 in the optical path changer sets 17a, 17b, 17c, . . . to form the stereoscopic image I that is a substantially plane image on the stereoscopic imaging plane P.

The stereoscopic imaging plane P may be perpendicular to the X-, Y-, or Z-axis. The stereoscopic imaging plane P may not be perpendicular to the X-, Y-, or Z-axis. The stereoscopic imaging plane P may not be flat and may be curved. Thus, the light guide plate 15 may form a stereoscopic image I on any (flat or curved) plane in a space using the optical path changers 16. Multiple plane images may be combined to form a three-dimensional image.

One or more embodiments disclosed herein should not be construed to be restrictive, but may be modified within the spirit and scope of the claimed disclosure. The technical features disclosed in different embodiments may be combined in other embodiments within the technical scope.

The invention claimed is:

1. A light guide plate device, comprising:
an incident surface configured to receive light from a light source; and
an optical path changer at a predetermined position on a back surface perpendicular to the incident surface, the optical path changer being configured to reflect light incident through the incident surface and guided to be emitted through an emission surface parallel to the back surface, wherein
the light emitted through the emission surface forms a formed image comprising a plane image representing a surface, and the plane image comprises an image of a continuous surface comprising a near imaging portion at an imaging position within a predetermined distance from the back surface and a distant imaging portion at an imaging position more distant than the predetermined distance from the back surface,
the predetermined distance is set to reduce contrast deterioration and blurring in the formed image at the near imaging portion and the distant imaging portion, and
the plane image has two ends comprised in the near imaging portion in a cross section perpendicular to the back surface and an optical axis of the light source.

2. The light guide plate device according to claim 1, wherein
the predetermined distance is 25% or less of a distance from the emission surface to a most distant imaging position of the distant imaging portion from the back surface.

3. The light guide plate device according to claim 1, wherein
the predetermined distance is 50% or less of an average of distances from the back surface to imaging positions of image formation areas of the formed image.

4. The light guide plate device according to claim 1, wherein
the predetermined distance comprises a distance between 12 mm from the back surface in a light emission direction and 24 mm from the back surface in a direction opposite to the light emission direction.

5. The light guide plate device according to claim 1, wherein
the predetermined distance is 20% or less of a minimum distance between the incident surface and the optical path changer.

6. The light guide plate device according to claim 1, wherein
the predetermined distance is 20% or less of a longer one of a maximum length of a projected image area of the formed image on the back surface in a direction perpendicular to the incident surface and a maximum length of the projected image area in a direction parallel to the incident surface.

7. The light guide plate device according to claim 1, wherein
the plane image has an annular shape in a cross section parallel to the incident surface, and
the back surface is located at a distance of 20% or less of a first distance from a center of the annular shape in a direction perpendicular to the emission surface, and the first distance is a distance from the center of the annular shape to a most distant imaging position in the direction perpendicular to the emission surface.

8. The light guide plate device according to claim 1, wherein
   - a projected image of the plane image as viewed in a direction perpendicular to the emission surface is longer in a direction parallel to the incident surface than in a direction perpendicular to the incident surface, and
   - two ends of the projected image in the direction parallel to the incident surface have imaging positions at the predetermined distance or less from the emission surface.

9. The light guide plate device according to claim 1, wherein
   - in a projected image of the plane image as viewed in a direction perpendicular to the emission surface, two ends of the projected image in a direction parallel to the incident surface have imaging positions at 30% or less of a second distance from the back surface, and the second distance is a distance from the back surface to a most distant imaging position of the distant imaging portion.

* * * * *